US008891814B2

(12) United States Patent
Vlachos et al.

(10) Patent No.: US 8,891,814 B2
(45) Date of Patent: Nov. 18, 2014

(54) SYSTEMS AND METHODS FOR METADATA EMBEDDING IN STREAMING MEDICAL DATA

(75) Inventors: Michail Vlachos, Tarrytown, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 13/491,561

(22) Filed: Jun. 7, 2012

(65) Prior Publication Data

US 2012/0281894 A1    Nov. 8, 2012

Related U.S. Application Data

(63) Continuation of application No. 12/042,961, filed on Mar. 5, 2008, now Pat. No. 8,229,191.

(51) Int. Cl.
*G06K 9/00* (2006.01)
*G06T 1/00* (2006.01)

(52) U.S. Cl.
CPC ....... *G06T 1/0071* (2013.01); *G06T 2201/0052* (2013.01); *G06T 2201/0061* (2013.01); *G06T 2201/0083* (2013.01); *G06T 2201/0051* (2013.01)
USPC .......................................... 382/100

(58) Field of Classification Search
CPC .............. G06T 2201/0051; G06T 1/0021; G06T 2201/0052; G06T 1/0028; G06T 1/0071; G06T 2201/0061; G06T 2201/0083; G06T 1/0042; G06T 1/0064; G06T 1/005; G06T 2200/28; G06T 2201/0065; G06T 2207/30144; G06T 1/0092; G06T 2201/0064; G06T 2201/0202; G06T 7/001; G06T 2201/0601; G06T 1/0035; G06T 1/0057; G06T 1/0078; G06T 1/0085; G06T 2201/0053; G06T 2201/0081; G06T 7/0002
USPC .......................................... 382/100, 128–134
See application file for complete search history.

(56) References Cited

U.S. PATENT DOCUMENTS

| 6,065,119 A | 5/2000 | Sandford, II et al. |
| 7,209,571 B2 | 4/2007 | Davis et al. |

(Continued)

FOREIGN PATENT DOCUMENTS

WO    0198866 A    12/2001

OTHER PUBLICATIONS

Eilsa Bertino,Beng-Chin Ooi,Yanjiang Yang,Robert H. Deng,Privacy and Ownership Preservinf of Outsourced Medical Data, in Proc. of ICDE, 2005, pp. 521-532.

(Continued)

*Primary Examiner* — Alex Liew
(74) *Attorney, Agent, or Firm* — August Law, LLC; George Willinghan

(57) ABSTRACT

Systems and methods for embedding metadata such as personal patient information within actual medical data signals obtained from a patient are provided wherein two watermarks, a robust watermark and a fragile watermark are embedded in a given medical data signal. The robust watermark includes a binary coded representation of the metadata that is incorporated into the frequency domain of the medical data signal using discrete Fourier transformations and additive embedding. Error correcting code can also be added to the binary representation of the metadata using Hamming coding. A given robust watermark can be incorporated multiple times in the medical data signal. The fragile watermark is added on top of the modified medical signal containing the robust watermark in the spatial domain of the modified medical signal. The fragile watermark utilizes hash function to generate random sequences that are incorporated through the medical data signal.

18 Claims, 6 Drawing Sheets

(56) References Cited

U.S. PATENT DOCUMENTS

| | | | |
|---|---|---|---|
| 7,515,730 B2 | 4/2009 | Tian et al. | |
| 2001/0016052 A1* | 8/2001 | Miller | 382/100 |
| 2002/0015509 A1 | 2/2002 | Nakamura et al. | |
| 2002/0052866 A1 | 5/2002 | Wortmann et al. | |
| 2002/0054122 A1 | 5/2002 | Lortie | |
| 2002/0059520 A1* | 5/2002 | Murakami et al. | 713/176 |
| 2002/0178410 A1 | 11/2002 | Haitsma et al. | |
| 2002/0184503 A1 | 12/2002 | Kalker et al. | |
| 2003/0050803 A1 | 3/2003 | Marchosky | |
| 2003/0179901 A1* | 9/2003 | Tian et al. | 382/100 |
| 2004/0057340 A1 | 3/2004 | Charles-Erickson et al. | |
| 2004/0071311 A1* | 4/2004 | Choi et al. | 382/100 |
| 2006/0177114 A1 | 8/2006 | Tongdee et al. | |
| 2008/0015428 A1* | 1/2008 | Epstein et al. | 600/410 |
| 2009/0226056 A1* | 9/2009 | Vlachos et al. | 382/128 |

OTHER PUBLICATIONS

G. Chiranjivi, V.K. Madasu, M. Hanmandlu, B.C. Lovell, Arrhythmia Detection in Human Electrocardiogram, in APRS Workshop on Digital Image Computing, 1 (1), pp. 189-192, 2005.

M. Engin, O. Cidam, E. Z. Engin, Wavelet Transformation Based Watermarking Technique for Human Electrocardiogram, in Journal of Medical Systems, vol. 29, No. 6 589-594, 2005.

M. Vlachos, P.S. Yu, V. Castelli, On Periodicity Detection and Structural Periodic Similarity, in Proceedings of SDM, 2005.

Michail Vlachos, Philip S. Yu, Systems and Methods for Embedding and Retrieving Metadata in Medical Measurements, IBM T.J. Watson Research Center, NY.

MIT-BIH Arrhythmia Database, "http://www.physionet.org/physiobank/database/mitdb/,".

Paulo Pinheiro da Silva, Deborah L. McGuinness, Rob McCool, Knowledge Provenance Infrastructure, in Data Engineering Bulletin vol. 26 No. 4, pp. 26-32, 2003.

Radu Sion, Mikhail J. Atallah, Suni Prabhakar, Rights Protection for Discrete Numeric Streams, in IEEE Trans. Knowl. Data Eng. 18 (5):699-714, 2006.

Xuan Kong, Watermarking Medical Signals for Telemedicine, in IEEE Transactions on Information Technology in Biomedicine, vol. 5, No. 3, 2001.

* cited by examiner

Randomized binary representation of SSN metadata, through hashing and Hamming coding Illustration of the watermark embedding and detection/retrieval process Localization of the fragile watermark is achieved through data 'blocking' into heart-beats. Subsequent selection of randomly generated windows within the heart-beat for embedding the fragile watermark.

Embedding:

Step 1: Let $x \in R^n$ be an ECG signal of size $n \times 1$.
Step 2: For each sample of $x$, remove the LSB to get $\tilde{x}$.
Step 3: Split $\tilde{x}$ into disjoint segments $\tilde{x}^i$ where each $\tilde{x}_i$ corresponds to a single heart-beat and $\tilde{x}$ is the union of $\tilde{x}^i$ $i = \in \{1,...,N\}$
Step 4: For each $i = \{1,...,N\}$
Step 4.1: Given $\tilde{x}^i$, generate $p$ possibly overlapping intervals (each with size $w \times 1$) with time stamps $\{t_1^i,...,t_p^i\}$,
Step 4.2: For each interval generate three semi-global features:
$g_{1,i} = T_1(\{\tilde{x}_{t_j}^i,...,\tilde{x}_{t_j+w-1}^i\})$, $g_{2,i} = T_2(\{\tilde{x}_{t_j}^i,...,\tilde{x}_{t_j+w-1}^i\})$ and $g_{3,i} = T_3(\{\tilde{x}_{t_j}^i,...,\tilde{x}_{t_j+w-1}^i\})$ where
$T_1(.)$ is the power of low-passed filtered $\{\tilde{x}_{t_j}^i,...,\tilde{x}_{t_j+w-1}^i\}$ with pass band $[0, \pi/3]$
$T_2(.)$ is the power of band-passed filtered $\{\tilde{x}_{t_j}^i,...,\tilde{x}_{t_j+w-1}^i\}$ with pass band $[\pi/3, 2\pi/3]$,
$T_3(.)$ is the power of high-passed filtered $\{\tilde{x}_{t_j}^i,...,\tilde{x}_{t_j+w-1}^i\}$ with pass band $[2\pi/3, \pi]$
Step 4.3: Construct $\kappa_i$ by appending $\kappa$ with appropriately quantized version of $g_{i,j}^i$,
$\kappa_i = CONCAT(\kappa\{g_{i,j}^i\})$.
Step 4.4: Generate a random vector of the same size of $x_i$ comprised of zeros and ones, $W_{fra}^i$ using $\kappa_i$ as the seed of a random number generator.
Step 4.5: Replace LSB's of $\tilde{x}^i$ with this random vector.

Embedding of fragile watermark

FIG. 5

Filters used for extracting various window statistics

Detection:

Step 1: Let $\hat{x} \in R^n$ be a watermarked ECG signal of size $n \times 1$ and $g \in R^m$ be a vector of side informations.
Step 2: For each sample of $\hat{x}$, remove the LSB and store it.
Step 3: Generate the side information sequence $\hat{g}$ following the exact same lines of WM embedding
Step 4: Generate fragile WM using $\hat{g}$ and SSN and compare it with the stored LSB's
Step 5: If they are different than the signal is tampered.
Step 6: If tampering is present, check $Tampering(i,l,j)$.

Detection of fragile watermark

FIG. 7

SYSTEMS AND METHODS FOR METADATA EMBEDDING IN STREAMING MEDICAL DATA

CROSS-REFERENCE TO RELATED APPLICATIONS

The present application is a continuation of co-pending U.S. patent application Ser. No. 12/042,961 filed Mar. 5, 2008. The entire disclosure of that application is incorporated herein by reference.

FIELD OF THE INVENTION

The present invention relates to the encoding, authentication and retrieval of metadata within medical data.

BACKGROUND OF THE INVENTION

Due to the recent explosion of identity theft cases, the safeguarding of private data has been the focus of many scientific efforts. Private data include medical data. Medical data contain a number of sensitive attributes that should only be disclosed to authorized personnel. In the years to come, healthcare systems are expected to experience a drastic change in its structure and organization as indicated, for example, in the Healthcare 2015 report showing that governments, health regions, hospitals and healthcare providers are allotting billions of dollars into multiple medical initiatives. One very important effort is the creation of electronic health records (EHR's). As the volume of health care data increases, more complex, storage and accessibility of medical information is not only invaluable but also necessary. The long-term goal for electronic health records is to make patient data readily available to health care providers such as hospitals and emergency personnel in a secure platform. Disasters, for example, Hurricane Katrina, have shown the practical utility of being able to store and retrieve information such as prescription histories and dosages electronically in an emergency.

One of the major technological and ethical issues governing electronic records is the issue of data privacy. Protection from unauthorized access on medical history data and personal patient data is something that can not only protect a patient's private data from identity theft schemes but can also can safeguard the healthcare and insurance system from fraudulent claims.

SUMMARY OF THE INVENTION

Systems and methods in accordance with the present invention provide techniques for hiding sensitive patient metadata within the actual medical measurements or streaming medical data. The medical measurements or streaming medical data, for example, data from a diagnostic test, are stored in a patient's medical record. A wide variety of medical data signals can be modified to embed patient metadata including electrocardiograms (ECG's) and encephalograms (EEG's) among others. Systems and methods in accordance with the present invention can also be used to embed metadata in any other type of dynamic and static data stream. In general, the metadata are embedded without destroying or adversely affecting the usability of the data in the data stream. The fusion of the metadata with the actual data yields an imperceptible distortion in the actual data. For most applications, this requirement is stated as preserving the visual/audio quality of the signal, i.e., for image and audio processing. When the data stream is medical data, the embedded metadata do not change the diagnosis of a physician relying on the data stream. For example, when dealing with ECG signals, common tasks include the detection of arrhythmia or other heart related illnesses. Therefore, the diagnosis on the modified signal containing the embedded metadata should not deviate from the diagnosis on the original signal.

The privacy of the embedded data is assured, because the private metadata are not embedded directly. Instead, a surrogate random sequence that is generated by a cryptographically safe hash function using the metadata as the input and a secret key as the seed is embedded. Therefore, the accidental or unintentional revelation of sensitive patient information to the public is prevented.

Systems and methods in accordance with the present invention embed private metadata within the actual information or data flow associated with that metadata, for example medical time-series signals. The data flows can be stationary or streaming. In addition to embedding the metadata, that metadata can be retrieved back, thereby bridging watermarking and channel coding techniques. In addition, exemplary embodiments of the present invention include error correction mechanisms. Therefore, a high level of resilience is provided, and the private data can be retrieved even when the data flow or signal containing the private data has been significantly corrupted.

Tight coupling of the metadata within the actual medical measurements presents several desirable properties. First, private information is effectively concealed in the signal and can serve as an additional authentication seal regarding the originality of the data. Second, the fusion of the metadata within the actual data can eliminate the need for recording the patient metadata separately, providing an additional level of security on the private information of a patient by thwarting deliberate changes on the medical records or eliminating accidental errors during a laborious replicating/typing process of a patient's record fields. Third, the methods and systems of the present invention can establish the provenance of the data. Therefore, if every recipient (or processor) of the data embeds a different secret watermark, then the lineage of how the data were produced, processed and distributed can be traced in a methodical fashion. Fourth, the method of embedding metadata in accordance with the present invention is applicable when collecting and transmitting streaming medical data. Such types of data are increasingly prevalent nowadays with the advent of economic sensor devices that can transmit various measurements of interest. Streaming medical measurements are, for example, transmitted during aeronautical exercises for measuring the stress level of a pilot or an astronaut. Also, tele-medical applications are not uncommon for patients that need continual monitoring, but are not required to reside in a hospital.

Systems and methods in accordance with the present invention can function as an additional authentication step, regarding the originality of the transmitted streaming medical measurements. In addition, the fusion of the metadata with the data is achieved in such a way that the data usability is not hindered or affected.

In accordance with one exemplary embodiment, the present invention is directed to a method for embedding metadata within medical data. Both a robust watermark containing an encrypted version of metadata related to a given medical data signal and a fragile watermark are embedded within the given medical data signal. In order to embed the robust watermark, the robust watermark is embedded in a transformed domain of the given medical data signal, for example using an orthogonal transform to provide the transformed domain.

Suitable orthogonal transforms include, but are not limited to, Fourier transforms and wavelet decompositions. In one embodiment, at least one of additive embedding and multiplicative embedding are used to alter only the magnitude of a plurality of coefficients in the transformed domain within the given medical data signal. In one embodiment, the given medical data signal is a one dimensional time-series sequence, and embedding the robust watermark includes obtaining an orthogonal transformation of the one dimensional time-series sequence, selecting frequencies within the one dimensional time series sequence to be modified, identifying magnitude modifications for each one of the selected frequencies based on the robust watermark to be embedded and applying the identified magnitude modifications to the descriptors associated with the selected frequencies. The orthogonal transformation includes a plurality of descriptors, each associated with a frequency of the one dimensional time-series sequence.

In one embodiment, embedding the robust watermark further also includes applying an inverse discrete orthogonal or Fourier transformation to the orthogonal or discrete Fourier transformation containing magnitude modified descriptors to obtain a modified time-series sequence of the medical data signal containing the embedded metadata. In one embodiment in order to identify the magnitude modifications, the magnitude modifications are computed using at least one of additive embedding and multiplicative embedding. In one embodiment, selecting descriptors to be modified includes selecting descriptors having a largest portion of energy of the medical data signal.

In one embodiment a plurality of copies of the robust watermark into the medical data signal. In one embodiment, embedding the robust watermark includes partitioning the time-series sequence into a plurality of subsequences and embedding the robust watermark in each one of the plurality of subsequences. Each subsequence includes a first bit string length. In addition, the watermark has a second bit string length, and the first bit string length is three times the second bit string length. In one embodiment, a binary code representation of the metadata is randomly generated using the metadata in combination with a secret key. Random generation of the binary code includes using the metadata and the secret key in a cryptographically secure hash function. In one embodiment, an error correcting code is incorporated into the binary code representation of the metadata. Suitable error correcting codes include, but are not limited to, Hamming coding. When Hamming coding is used, four bit groupings are mapped from the binary code into seven bit groupings.

In one embodiment in order to add the fragile watermark is added on top of the robust watermark in the medical data signal. In one embodiment, the fragile watermark is embedded in a spatial domain of the medical data signal that represents least significant bits of the medical data signal. In one embodiment, in order to embed the fragile watermark, the medical data signal is divided into a plurality of blocks, and the least significant bits in each block are set to zero. In each block, a plurality of randomly located intervals and hash values for each block are generated. The generated hash values and the metadata are used in a random number generator to generate a corresponding fragile water mark for each block, and each corresponding fragile watermark is embedded into the least significant bits of the block from which the hash values used to generated that corresponding fragile watermark were obtained. In one embodiment, generation of the hash values for each block includes generating three different hash values for each block by calculating power associated with the medical data signal in a randomly selected location of that block when that signal is filtered by a low pass filter, a high pass filter and a band pass filter. In general, the embedded metadata include personal information for a patient from which the medical data signal was obtained.

BRIEF DESCRIPTION OF THE DRAWINGS

FIG. 5 is an illustration an embodiment of embedding a fragile watermark;

FIG. 7 is an illustration of an embodiment of detecting a fragile watermark.

DETAILED DESCRIPTION

In accordance with exemplary embodiment for embedding and retrieving metadata in data streams such as medical signals, notions from data watermarking and channel coding are utilized. Although the present invention is described with reference to a medical signal embodiment, the methods of the present invention can be utilized with any suitable type of streaming or static data stream. The sensitive metadata, for example, a social security number (SSN) or birth data, are embedded as a hidden watermark within the medical measurements of the patient. In order to provide additional protection and data resilience, two separate types of watermarks are each embedded on the medical signal. The first watermark is a robust watermark for encoding and storing the actual metadata. The second watermark is a fragile watermark that is used for identifying possible data tampering. The robust watermark encodes an encrypted version of the metadata, employing additional data redundancy for aiding data recovery in the case of data corruption by a malicious attacker. A robust watermark cannot be easily removed without significantly distorting the actual data in the data stream, i.e., without obvious attacks, which in any case will render the data useless. The fragile watermark is used to detect potential data tampering. Simple operations can destroy the fragile watermark, and the absence of the fragile watermark on the received data is an indication that the data have been compromised or altered.

Watermarking methods in accordance with the present invention incorporate randomization to alleviate the vulnerability to malicious attackers or common alterations on the host signal. The robust watermark encoding the actual metadata is embedded in the frequency domain, and the data are masked effectively in certain frequencies that are selected based on a secret key. This type of embedding makes the embedded data resilient to transformations such as translations, least significant bit alternations, small noise additions, re-sampling and decimation. In addition, the regions where the private metadata are embedded are selected based on a secret key. A fraction of the hidden metadata bits are allocated for employing error correction codes, in order to provide additional resiliency due to malicious attacks or even due to transmission errors.

The fragile watermark is embedded after the robust watermark on the least significant bits at specially selected positions of the ECG signal. The fragile embedding introduces virtually no distortion. Even though the fragile watermark is embedded on top of the robust, the fragile watermark cannot destroy the robust watermark, which is able to withstand such minor (or even more significant) transformations.

Figure 1:
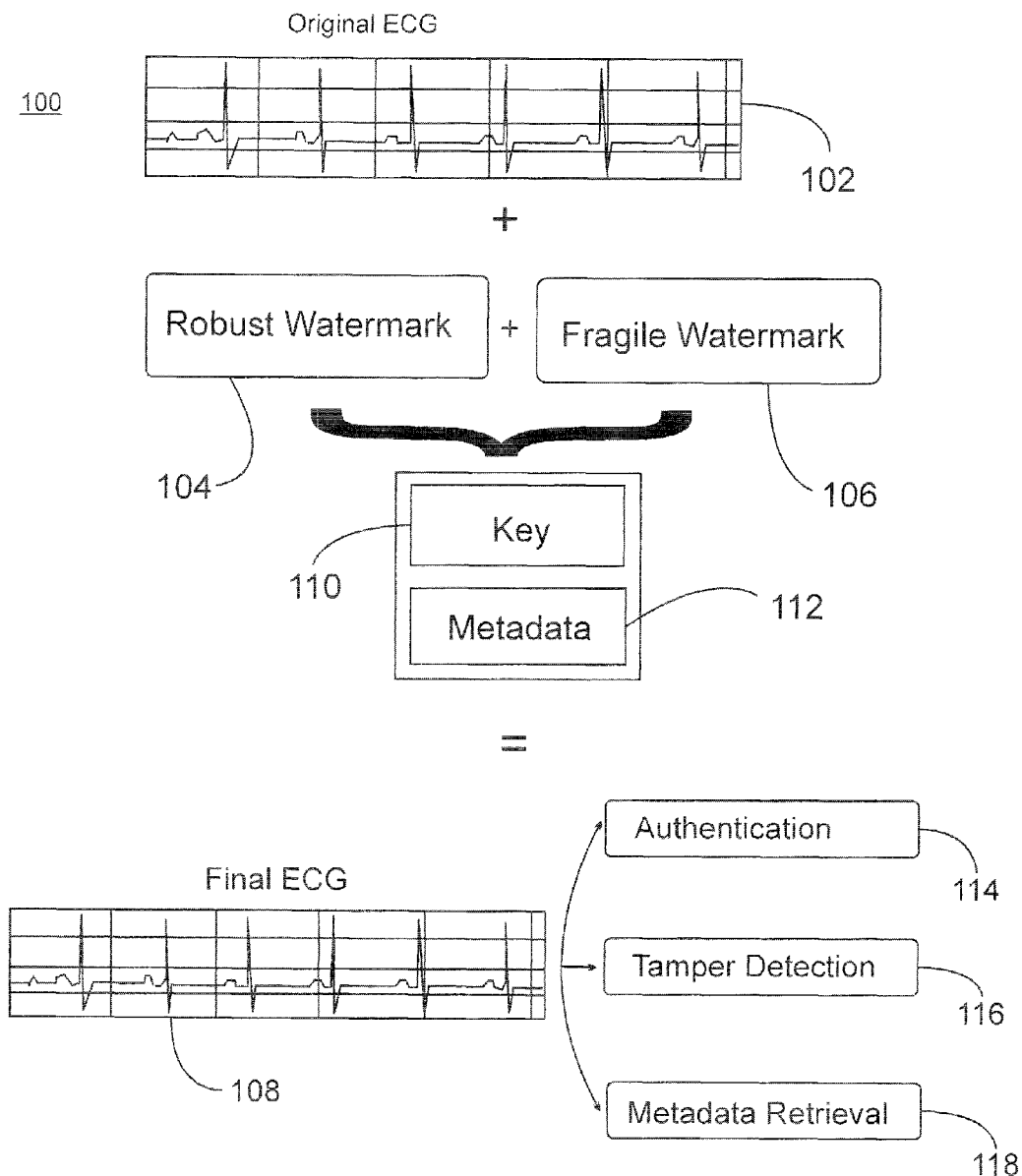
FIG. 1 is a schematic representation of an embodiment of the watermark embedding process of the present invention.

Referring to FIG. 1, an exemplary embodiment of the embedding of both a robust and fragile watermark in accordance with the present invention 100 is illustrated. As illustrated, to an incoming ECG data stream 102, both a robust watermark 104 and a fragile watermark 106 are added using the desired metadata 112 and a secret key 110. this produces a modified ECG 108 that can be stored or propagated as needed. Following delivery of the modified ECG, that data stream is read, and the watermarks embedded in the modified ECG are also identified and read to provide authentication 114, tamper detection 116 and metadata retrieval 118. Tamper detection is provided by examining the modified ECG for presence of the fragile watermark. Data authentication is provided through correlation of the originally embedded metadata. Data authentication refers to the authentication of the data as having come from a specific source or patient. For example, if the SSN of a patient is embedded in an ECG signal, then using the SSN and a secret key, one can verify that the data indeed belong to the patient with a specific Social Security Number. Regarding metadata retrieval, the rightful owner of the data can provide the secret key to a third party that is in a position to retrieve the embedded metadata from the medical signal.

In one embodiment in order to provide for robust watermarking, a data stream such as a medical data stream or ECG signal, is considered a one dimensional time-series sequence, represented as a vector $x=\{x_1, \ldots, x_n\}$, where $x_k \in R$. Private numeric metadata are embedded in this signal using watermarking techniques. In addition, the hidden metadata can also be retrieved from the modified signal, fusing both watermarking and channel coding techniques. The secret information that is hidden inside each ECG signal is encoded as a watermark $W \in \{-1,1,0\}^n$, which has the same length as x and can take 3 distinct values. Embedding the watermark utilizes a composition function that, given x and W returns a modified signal which is similar to x and encloses W. The original ECG signal is not significantly distorted, and a technique to retrieve or detect W in the watermarked signal is provided. This watermark is referred to as robust because it is able to withstand a variety of possible data transformations. In one embodiment, the robust watermark is not embedded in the original Space-Time domain but into the Frequency domain, which guarantees better resilience against malicious attacks.

Every ECG signal x is represented using its Fourier descriptors $X=\{X_1, \ldots, X_n\}$ where n is the number of points of x as well as the number of its frequency components. The mappings from one domain to the other are described by the discrete Fourier transform dft(x):

$$X_j = \frac{1}{\sqrt{n}} \sum_{k=1}^{n} x_k \exp\left(-i\frac{2\pi}{n}(j-1)(k-1)\right)$$

and the inverse discrete Fourier transform idft(X):

$$x_j = \frac{1}{\sqrt{n}} \sum_{k=1}^{n} X_k \exp\left(i\frac{2\pi}{n}(j-1)(k-1)\right)$$

Every coefficient $X_j$ can be described in terms of its magnitude $\rho_j$ and phase $\phi_j$, that is, $X_j = \rho_j e^{\phi_j i}$.

Additive Fourier embedding of the watermark is used, which alters only the magnitudes but retains the original phase. Therefore, for a signal $x \in R^n$ and a watermark $W \in R^n$, the additive Fourier embedding generates a watermarked signal x by replacing the magnitudes of each Fourier descriptor of x with a watermarked magnitude $\hat{\rho}_j$:

$$\hat{\rho}_j = \langle \rho_j + pW_j \rangle \underline{def} \max(0, \rho_j + pW_j)$$

where power p>0 specifies the intensity of the watermark.

The function ⟨•⟩ is used in order to ensure that there are no resulting negative magnitudes, when $W_j=-1$. This may introduce a power loss into the watermarking procedure. Using the modified magnitudes $\hat{\rho}_j$ and the original phases $\phi_j$, a return is made from the frequency domain to the time domain to reconstruct the watermarked sequence using the inverse discrete Fourier transform. Although illustrated with a Fourier Transform, any suitable orthogonal transforms, where the metadata can be embedded in, can be used.

In one embodiment, in order to construct the watermark, private metadata are embedded into the watermark, which is hidden in the data stream. The watermark W contains the values +1, −1 and 0. Only $W_j$'s that contain +1 or −1 will introduce some alteration in the respective signal frequencies. Therefore, only those $W_j$'s can encode some information. Conversely, the zero values of W determine the descriptors that are not to be modified.

The choice of which Fourier descriptors (frequencies) are most suitable to be altered, i.e., to be actually used for the embedding, can affect the goodness of the detection process. In one embodiment, an unbreakable bond is created between a signal and an embedded watermark. Conversely, a potential attack cannot alter the overall shape of the ECG plot, i.e., damage the usability of that plot. Therefore, the embedded metadata W is tied with the most important frequencies. The first descriptors in the signal hold almost all the energy of ECG signals, which means that these descriptors describe very accurately the data. Driven by these considerations, the watermark is embedded in the lowest frequencies. However, no portion of the watermark is embedded on the first Fourier descriptor $X_1$, since the DC component of the signal $x(X_1 = \Sigma_j x_j/\sqrt{n})$ is easily susceptible to attacks. For example, a simple translation will change the DC level of x (that is, $X_1$) without affecting its shape, but it will erase this part of the watermark. Therefore, the watermark into the $2^{nd}$ and up to the $(l+1)^{th}$ Fourier descriptor, where l is the number of non zero elements of W. The watermark W is formally defined as follows:

$$W_j = \begin{cases} 0 & \text{if } j = 1 \ (DC\ component) \\ \{-1, 1\} & \text{if } 2 \le j \le l+1 \\ 0 & \text{if } l+2 \le j \le n \end{cases}$$

The metadata that are to be embedded in the ECG signal are represented with a sufficiently long bit-string. In order to provide additional resilience to attacks, additional pre-processing is conducted before materializing the watermark W. A binary representation, B(I), of the information I, e.g., metadata, is randomly generated using the original information and part of the secret key κ. In one embodiment, a randomized representation of the metadata is used in order to protect the private information of the patient. An error correcting code of $H_{7,4}(B(I))$ using the Hamming (7, 4) coding is produced. Introducing channel coding is used to detect errors during the transmission of bit-streams over a noisy channel. In one embodiment as illustrated, this process introduces a controlled level of redundancy by mapping an input of 4 bits into a code of 7 bits. Using this added redundancy, the receiver of the message, i.e., the data stream, corrects 1-bit errors and detects 2-bit errors. In addition, malicious attacks that may flip one or more bits of the embedded watermark are detected. The Hamming (7, 4) encoding is used for its simplicity; however, more complicated and effective techniques can also be utilized. For example, the Reed-Solomon code, which is currently used in CDs and DVDs, can be used and provides augmented correction capabilities.

Given the above, the embedded watermark that can encode the metadata I is defined as follows:

$$W_j = \begin{cases} 0 & \text{if } j = 1 \ (DC component) \\ 1 & \text{if } (j-1)-th \text{ bit of } H_{7,4}(B(I)) = 1 \\ -1 & \text{if } (j-1)-th \text{ bit of } H_{7,4}(B(I)) = 0 \\ 0 & \text{if } l+2 \leq j \leq n \end{cases}$$

where l=|B(I)| is the length of the binary representation of I.

Figure 2:
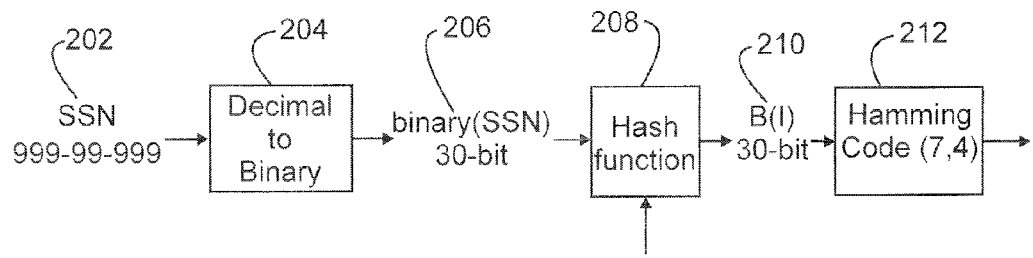
FIG. 2 is a schematic representation of an embodiment of the creation of a binary coded watermark containing the desired metadata to be embedded.

Referring to FIG. 2, in one exemplary embodiment of creating a robust watermark in accordance with the present invention, a social security number (SSN) 202 is the metadata to be embedded in a given ECG plot. The SSN in the United States includes digits in the form 999-99-9999. This number is converted from its decimal representation to a binary representation 204. Any number<$10^9$ can be represented with a 30-bit long string, which for conciseness is referred to as the binary (SSN) 206. This initial representation can be as simple as the binary conversion of the decimal SSN. The binary representation binary (SSN) is then inserted into a cryptographically secure hash function 208 with κ as the secret key to produce the final randomized 30 bit long string B (SSN) 210. The error correcting code is then applied by dividing the binary representation into seven portions each containing four bits each. The Hamming coding is applied independently to each chuck 212. The result is a l=57 bits long error correcting code enclosing a given SSN.

After the robust watermark is created using the desired metadata, without loss of generality, a spread spectrum approach is used to embed this robust watermark into the data stream, in this case the host medical signal. Although the spread spectrum approach is described, any other robust watermarking method can also be used. In one embodiment, a plurality of copies of the same robust watermark are embedded a single time-series sequence. Initially, the single time-series sequence is partitioned into a set of subsequences S. In the case of an ECG signal, the partitioning creates a set of sub-ECGs. The watermark is embedded into each one of the plurality of sub-ECGs contained in the set of sub-ECGs. Embedding a plurality of copies of the watermark into a single signal distributes the power of the watermark across multiple frequencies of the signal subsequences, making the removal of the watermark particularly difficult while at the same time preserving the important data characteristics. In other words, a stronger watermark is obtained with less power, i.e., less noise introduced in the original ECG by spreading the watermark signal over the whole data.

In one embodiment, given an ECG signal x=$\{_1, \ldots, x_n\}$, we first select a random starting point $t_\kappa$ using κ as the seed of a pseudo-random number generator. Then, the ECG signal x is split into $|S|=\lfloor n/m \rfloor$ adjacent subsequences, starting from $t_k$. However, when the last point of x, i.e., $x_n$, is reached, the watermark W continues to be cyclically embedded from $x_1$ until the remaining n−m*s points of x. The last n−m*s remaining points before $x_{t_k}$ are ignored. The set of these subsequences is denoted with S and refer to the set as characteristic subsequences. Each characteristic subsequence contains m=3*l points such that each subsequence is 3 times longer than the bit-string to be hidden into the data. This simply allocates enough bandwidth in order to embed the watermark in the lowest frequencies of each subsequence, since the length should be at least 2 times the length of the watermark due to the conjugate symmetry of Fourier coefficients. The magnitudes of each subsequence are then updated according to the additive embedding scheme described before.

The embedding process returns the second part of the secret key β to be used during the detection process described later. The vector β is defined as the average values of the several $\rho_j$ of the subsequences in S, only for those j such that $W_j \neq 0$:

$$\beta_j(x) = \frac{1}{|S|} \sum_{s \in S} \rho_j(s)$$

Note that the vector β is calculated on the original ECG, i.e., before the watermarking takes place. Unlike a non-blind watermarking approach, where in order to retrieve the watermark it is necessary to have access to the original data, systems and methods in accordance with the present invention only need the vector Θ=[κ,β]. Therefore, the original data is not reveled to the users, avoiding any obvious security risks.

Potential transformations in a medical signal include vertical shifts, re-sampling (upsampling or downsampling) and cropping. By construction, methods in accordance with the present invention are resistant to vertical shifts, which only affect the first frequency component (the DC). However, no part of the watermark is embedded in the first frequency component. Systems and methods in accordance with the present invention also provide resilience to other types of attacks such as noise addition, upsampling and decimation.

The amount of noise introduced in a watermarked signal $\hat{x}$ as the relative error ε, with respect to the original x:

$$\varepsilon(x, \hat{x}) = \frac{\|x - \hat{x}\|}{\|x\|}$$

where, $\|\cdot\|$ signifies the $L_2$ norm of a vector. Considering a single subsequence s of x, then due to Parseval's theorem, and after some algebraic manipulations, it is easy to see that:

$$\|s - \hat{s}\|^2 = \|S - \hat{S}\|^2$$
$$= \|\rho - \hat{\rho}\|^2 + 2 \sum_j \rho_j \hat{\rho}_j \left[1 - \cos(\phi_j - \hat{\phi}_j)\right]$$
$$= \|\rho - \hat{\rho}\|^2 \ (\text{since } \phi_j = \hat{\phi}_j)$$

-continued $$= \|\rho - \langle \rho + pW \rangle\|^2 \leq \|pW\|^2$$
$$= lp^2$$

This yields an upper bound to the error introduced in a single subsequence, assuming that $\langle \rho+pW \rangle =(\rho+pW)$. In addition, additive watermarking introduces an error that is proportional to the square root of key length and to the watermarking power. To get an upper bound on the error, $\epsilon_p$, for the whole signal x, the previous result for each segment are applied to yield:

$$\varepsilon_p = \frac{1}{\|x\|}\sqrt{\sum_{s \in S} lp^2} = p\frac{\sqrt{|S|l}}{\|x\|}$$

Figure 3:
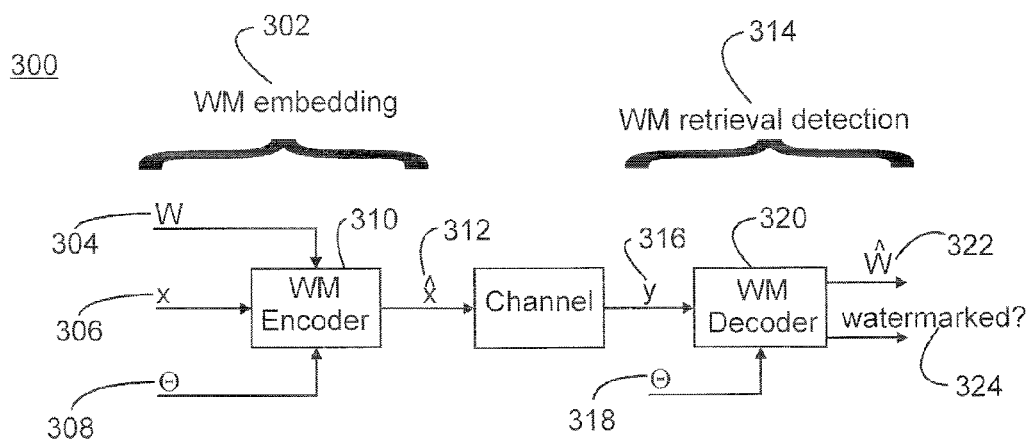
FIG. 3 is a schematic representation showing the embedding and retrieval of a watermark in accordance with the present invention.

In order to retrieve the embedded metadata, the enclosed robust watermark is retrieved using the knowledge of the secret key $\Theta=[\kappa,\beta]$. Referring to FIG. 3, an exemplary embodiment of the detection and retrieval of an embedded robust watermark 300 is illustrated. In the watermark embedding portion 302, a watermark encoder 310 is provided with the watermark 304, the original data stream or signal 306 and the secret key 308. Using these inputs, the modified signal 312 is created that contains the embedded watermark. In general, only the owners of this secret key are allowed to retrieve the sensitive metadata present in the data. The first part of key vector $\kappa$ is randomly selected from the key space, and the second part of key vector $\beta$ depends only on the data and does not have any correlation with the watermark. By disclosing the secret key $\Theta$ and not the watermarked data, no information can be inferred about the secret metadata.

In the retrieval and detection portion 314 of the process, the modified signal 312 is read as a received signal 316 to input to a watermark decoder 320 along with the secret key 318. For retrieving the private metadata from the received signal, the watermarking process is reversed by comparing the value of $\beta$ from the original ECG and the new value $\beta_y$ that is calculated from the received ECG signal 316. The decoder is used to detect the presence of a watermark 324 and to obtain that watermark 322 from the received signal. The received signal y is equal to the watermarked data $\hat{x}$ if there is no distortion, i.e., no attack, on the signal. Given a received (watermarked) signal y, this received signal is split y into a new set of characteristic subsequences $S_y$, exactly as done during the watermark embedding process. In order to retrieve the metadata, the calculated statistics from the received signal y are $\beta_y$, and a binary vector Z can be defined as:

$$Z_i = \begin{cases} 1 & \text{if } \beta_i^y - \beta_i \geq \tau \\ 0 & \text{if } \beta_i^y - \beta_i < \tau \end{cases}$$

where the threshold is selected to control the trade-off between false alarm (FA) and false rejection (FR) rate. Then, the received B(SSN) is given by $R=H_{7,4}^{-1}\langle Z \rangle$ where R is equal to B(SSN) if there is no error in retrieval.

If $\beta_j^y-\beta_j \geq \tau$, the j-th element of the embedded watermark may be equal to 0 ($W_j=0$), and symmetrically equal to 1 if $\beta_j^y-\beta_j<\tau$. In order to get the actual data, the Hamming decoder $H_{7,4}^{-1}$ is used. Using this decoder, two pieces of information are retrieved. First, an inference regarding the presence of some error in the retrieval of R is made, and second an attempt is made to remove that error.

Continuing with the example that utilizes a 9 digit SSN of a patient as the secret metadata to embed in a medical data signal, the 9 digit decimal SSN was converted into a 30-bit long binary stream, and the resulting binary representation is inputted into a cryptographically safe hash function, with $\kappa$ as the secret key. This yields the 30-bit long random sequence to which Hamming (7,4) is applied for each 4-bit blocks of this data to yield a watermark signal of 56-bit long, i.e., [30/4]*7=56. Given an ECG signal x, this W would be embedded for each segment of size 3×56. After decoding the watermarked signal, Z is obtained. If there is no attack on x, than it is easy to see that Z should be equal to W, since $\beta^y-\beta=\hat{\beta}-\beta=pW$. In the presence of an attack, the goodness of the watermarking can be measured as:

$$\text{Goodness} = 1 - \frac{\sum ZXORW}{56},$$

i.e., the percentage of bits correctly retrieved.

In one embodiment, the mere presence of the watermark is detected without retrieving back the embedded metadata. This is achieved using a generalized correlation detector that is defined as follows. Let x, $\hat{x}$ and y be the original, watermarked and received signals, respectively. The characteristic subsequences $S_y$ is the set derived from the received signal y and equal to $\hat{S}$ if there is no distortion on the watermarked signal $\hat{x}$. The calculated statistics from the received signal y are $\beta^y$. The generalized correlation detector is:

$$\frac{\langle \beta^y - \beta, \hat{\beta} - \beta \rangle}{\|\hat{\beta} - \beta\|^2} \begin{cases} > \tau & \text{watermarked} \\ \leq \tau & \text{not - watermarked} \end{cases} \quad (1)$$

where the threshold $\tau$ is selected based on the desired false acceptance and false rejection rate, and $\langle x,y \rangle = \Sigma_i x_i y_i$.

The above correlation detector is decision-theoretic optimal when the disturbance on $\hat{x}$ is white Gaussian noise. However, in case of non-Gaussian disturbances, updated correlation detectors are introduced that work directly on the received bits instead of $\beta$ values:

$$\frac{\langle Z, W \rangle}{\|W\|^2} \begin{cases} > \tau & \text{watermarked} \\ \leq \tau & \text{not - watermarked} \end{cases} \quad (2)$$

and $$\frac{\langle R, B(SSN) \rangle}{\|B(SSN)\|^2} \begin{cases} > \tau & \text{watermarked} \\ \leq \tau & \text{not - watermarked} \end{cases} \quad (3)$$

After the robust watermark, which encloses the private metadata, is embedded in the ECG signal, a fragile watermark is added on top of the resulting signal. The fragile watermark is used to efficiently detect subsequent alterations to marked data. Although, the robust watermark is resilient against most of the benign signal processing operations, for example, compression, cropping and decimation, and against malicious attacks that intentionally attempt to remove the underlying watermark, fragile watermarks detect (with high probability) even the slightest changes on the underlying watermarked data. Although conceptually different, the embedding and detection of fragile watermarks is similar to that of robust watermarking.

In one embodiment, fragile watermarking exhibits the following properties. The embedded watermark does not interfere with the underlying usage of the signal. This reduces the candidate algorithms that one can use on the fragile watermark in order to induce only minimal effects on the underlying ECG signal. In addition, the fragile watermarking is able to detect the presence of tampering on the medical signal. The fragile watermarking provides localized information about tampering. To satisfy this, the fragile watermark is localized. The candidate fragile watermark is able to quantify the nature of the underlying alterations or attacks on the corresponding signal. For some applications this property is important, because most benign signal processing operations such as compression or change of axis by DC addition/subtraction will destroy the fragile watermark. However, the underlying signal is still useful for all practical purposes. Therefore, the fragile watermark can quantify the underlying cause of the alteration as much as possible in order to assist the final judgment on the usability of the tampered signal.

In one embodiment, the fragile watermark is embedded in the spatial domain on the least-significant-bits (LSB's) of the data stream, e.g., the ECG signal. Algorithms that alter the LSB's are extremely effective for detection of random perturbations, but in their most basic form are very susceptible to malicious attacks. One can easily change the underlying watermarked signal, in the extreme case completely replace with another signal, without touching the LSB's. This kind of vulnerability to malicious attacks can be reduced by including context information into the watermark. In one embodiment, the embedded watermark signal is both context and data dependent in a randomized manner in order to avoid any possibility of an attacker either replacing the watermark partially or completely or altering the watermarked signal. The fragile watermark embedded in the LSB's depends on randomly generated semi-global data statistics, which capture the essential features of the underlying signal. Randomization is used in order to eliminate the possibility of an attacker retrieving any information about the original key. Since, an attacker that has access to the original key could use this key for watermarking arbitrary data. The complete description of embedding and detecting the fragile watermark are illustrated in FIGS. 5 and 7, respectively.

In order to embed the fragile watermark in a signal $x=\{x_1, \ldots, x_n\}$, the underlying signal is separated into blocks based, for example, on a quality of the given signal. For example, when the signal is an ECG signal, the underlying signal is separated into blocks based on heart-beats, i.e., each heart-beat duration is a segment, where $x^i$ is the portion of the ECG signal corresponding to the $i^{th}$ heart beat. To achieve a beat to beat signal separation, an energy based filter is utilized, since the ECG signal should exhibit higher energy at the frequency indicated by the heart beat. The heart beat separation does not have to be exact, since this block processing is merely a way of providing broad localization information upon the fragile watermark. The inherent pattern regularity of the ECG signal is being used to establish an effective localization capability for the fragile watermark.

Figure 4:
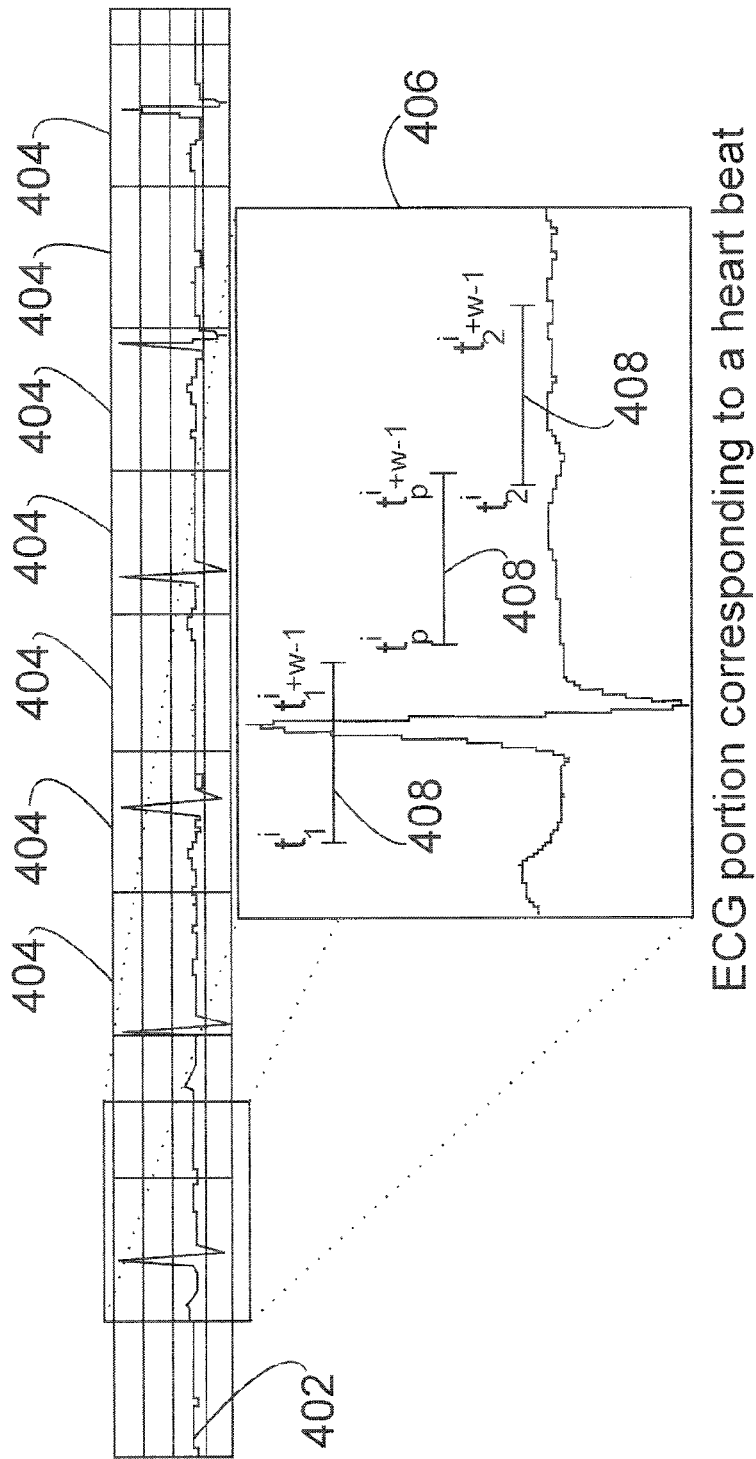
FIG. 4 is a schematic representation of the creation and embedding of a fragile watermark in accordance with the present invention.

The LSB from each $x_k^i$ to get $\tilde{x}_k^i$, i.e., $\tilde{x}$ is the ECG signal where all LSB's are set to zero. The secret key $\kappa$ is the seed for a pseudo random number generator to generate p randomly located intervals with length w, where $\{t_1^i, \ldots, t_p^i\}$ are the randomly selected starting points for each interval. Referring to FIG. 4, an underlying ECG signal 402 is divided into a plurality of blocks 404 such that each block corresponds to one heartbeat in the ECG signal. For a given block 406, a plurality of randomly located intervals 408 of a given length w are generated such that the selected starting points of each interval are $\{t_1^i, \ldots, t_p^i\}$. Each $t_j^i$ is selected to avoid any interference with the next segment, i.e., $t_j^i+w-1$ is less than the starting point of the next segment. The length of these windows w is set as a tradeoff between capturing the essential (or global) characteristics of the signal and capturing local characteristics. Given a randomly selected location and a window of length w, semi-global statistics are generated from this portion of the data. These statistics can also have random components in their generation. Preferably, however, such randomization is not used, except for their locations. Algorithms in accordance with exemplary embodiment of the present invention are generic such that this kind of alteration can readily be incorporated. The windows can be overlapping to avoid constraining the selection of locations to reveal limited information to an attacker. In addition, these local and randomly generated features are referred to as hash values. These hash values are used, after appropriate quantization, in combination with the embedded metadata as the seed of a random number generator to generate the final fragile watermark containing zeros and ones of length equal to the duration of a given block, e.g., heart-beat duration. The resulting fragile watermark is embedded to the LSB's of the corresponding block or heart-beat. The same process is repeated for each block or heart-beat to create the watermarked ECG signal.

Figure 6:
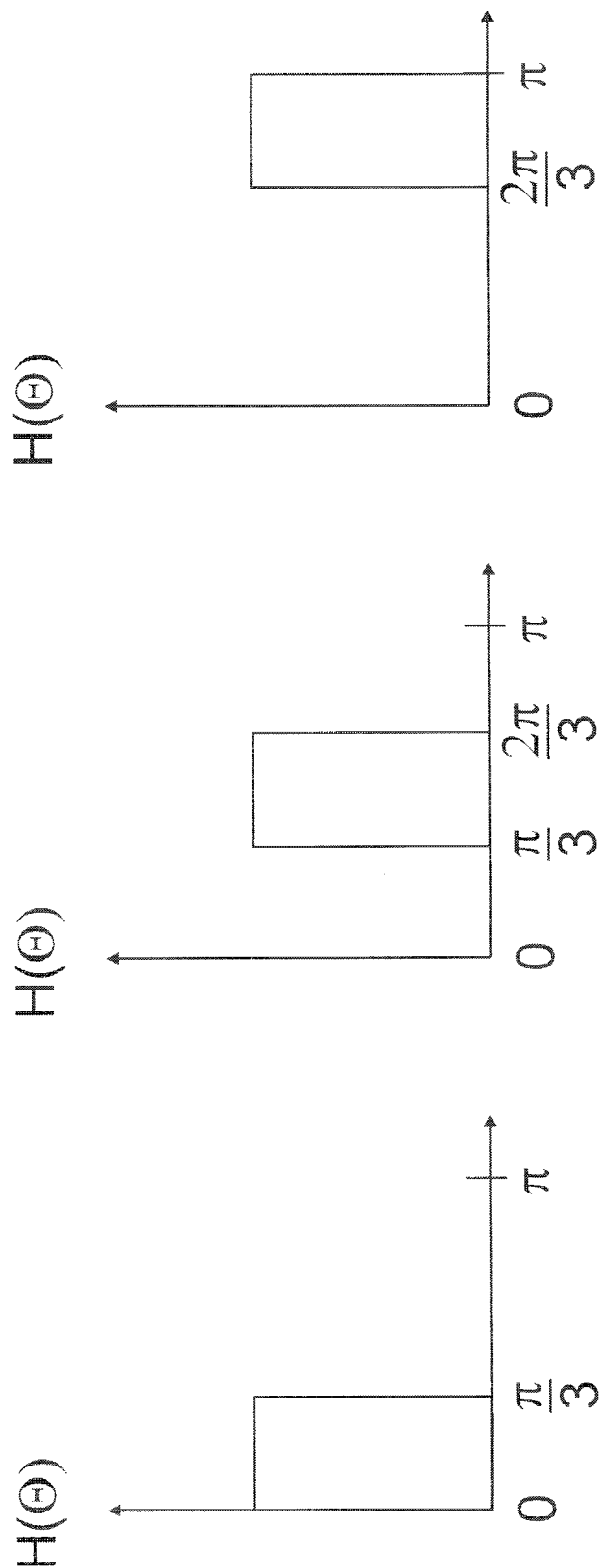
FIG. 6 is a graph illustrating filters used to extract statistics used in creating the fragile watermark.

Several different statistics or hash values are generated per block or window to capture different features of the data in that window. In one embodiment, three different hash values are generated per window, $g_{1,j}^i, g_{2,j}^i, g_{3,j}^i, j=\{1, \ldots, p\}$, by calculating the power of the corresponding signal filtered by a low pass filter, a band pass filter and a high pass filter as illustrated, for example in FIG. 6. Therefore, for each heart-beat segment:

$$g_{1,j}^i = T_1(\{\tilde{x}_{t_j}^i, \ldots, \tilde{x}_{t_j+w-1}^i\}), j \in \{1, \ldots, p\}$$

$$g_{2,j}^i = T_2(\{\tilde{x}_{t_j}^i, \ldots, \tilde{x}_{t_j+w-1}^i\}), j \in \{1, \ldots, p\}$$

$$g_{3,j}^i = T_3(\{\tilde{x}_{t_j}^i, \ldots, \tilde{x}_{t_j+w-1}^i\}), j \in \{1, \ldots, p\}$$

where $T_1(x)(T_2(x), T_3(x))$ represents the composite operation of first lowpassing (bandpassing, highpassing) the signal x and then calculating the power of lowpass (bandpass, highpass) filtered signal. All hash values corresponding to all segments and windows are collected in $g=\{g_{1,j}^i\}$. These three different hash values capture the different features of the data. For example, a local shift of the heart-beat data, i.e., a DC addition or subtraction, will not affect the hash values generated by the high pass or bandpass filters, hence revealing and localizing the corresponding tampering. The amount of tampering could also be determined as the amount of change in the corresponding hash values. Even a local tempering could be pinpointed since several overlapping windows are used for each heart-beat segment. Although simple outputs of straightforward DSP filters are used, more sophisticated filters or algorithms that are tuned for a particular application or a signal database can be easily introduced in the algorithm. Each new addition will introduce further localization or capture different features of the data. After collecting the hash values for each interval for each segment of a heart-beat, the patient metadata is appended with appropriately quantized values of these hash values as the seed of a random number generator $\kappa_i = \text{CONCAT}(\kappa\{g_{i,j}^i\})$ to generate the fragile watermark for this segment $W_{fra}^i$. The fragile watermark, $W_{fra}^i$, is the same length as the $i^{th}$ segment and contains only zeros and ones. This randomly generated fragile watermark is the LSB's of this particular segment. This procedure is replicated for each heart-beat segment to get the final fragile watermarked signal.

For detecting the fragile watermark, steps similar to the embedding are followed. Given a watermarked ECG signal $\hat{x}$ and hash values g of the original data as the side information, the LSB's for each $\hat{x}_k$ are removed and stored. The hash values are generated for each heart-beat segment using the same random number generator with κ as the seed. After getting the time stamps, $\{t_1^i, \ldots, t_p^i\}$, the following hash values are calculated:

$$\hat{g}_{1,j}^i = T_1(\{\hat{x}_{t_j}^i, \ldots, \hat{x}_{t_j+w-1}^i\}), j \in \{1, \ldots, p\}$$

$$\hat{g}_{2,j}^i = T_2(\{\hat{x}_{t_j}^i, \ldots, \hat{x}_{t_j+w-1}^i\}), j \in \{1, \ldots, p\}$$

$$\hat{g}_{3,j}^i = T_3(\{\hat{x}_{t_j}^i, \ldots, \hat{x}_{t_j+w-1}^i\}), j \in \{1, \ldots, p\}$$

where with an abuse of notation $\hat{x}$ is used to represent the watermarked signal with LSB's removed. The final random signal is then generated using concatenated κ and the quantized hash values as the seed of a random number generator, $\hat{\kappa}_i = \text{CONCAT}(\kappa \{\hat{g}_{1,j}^i\})$. This random sequence $\hat{W}_{fra}^i$ is compared with the stored LSB's to reveal any alteration. If these two sequences differ, a possible tampering is noted. A check is made to determine if this tampering can be localized through the use of the hash values by calculating:

$$\text{Tampering}(i, l, j) = \frac{|\hat{g}_{l,j}^i - g_{l,j}^i|}{|g_{l,j}^i|}, j = \{1, \ldots, p\}, l = \{1, 2, 3\}$$

for each segment i. The absolute relative change in the hash values reveals the possible tampering in the respective region. Although most of the tampering should be localized by the hash values, small changes on the data (intentional or not intentional) may not be caught by the hash values (although they will be caught by our fragile watermarking).

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution.

Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for coupling meta-data within streaming medical data in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for embedding metadata within medical data, the method comprising:
    embedding within actual medical data in a given medical data signal a robust watermark comprising an encrypted version of metadata related to the actual medical data that given medical data signal wherein removal of the robust watermark disturbs the actual medical data; and
    embedding a fragile watermark into that given medical data signal on top of a resulting medical data signal containing the robust watermark in least significant bits of the medical data signal to provide tamper identification of the actual medical data.

2. The method of claim 1, wherein the step of embedding the robust watermark further comprises embedding the robust watermark in a transformed domain of the given medical data signal.

3. The method of claim 2, further comprising using an orthogonal transform to provide the transformed domain.

4. The method of claim 3, wherein the orthogonal transform comprises a Fourier transform or wavelet decomposition.

5. The method of claim 2, wherein the step of embedding the robust watermark in the transformed domain further comprises using at least one of additive embedding and multiplicative embedding to alter only the magnitude of a plurality of coefficients in the transformed domain within the given medical data signal.

6. The method of claim 1, wherein the given medical data signal comprises a one dimensional time-series sequence.

7. The method of claim 1, wherein the step of embedding the robust watermark further comprises applying an inverse discrete Fourier transformation to a discrete Fourier transformation comprising magnitude modified descriptors to obtain a modified time-series sequence of the medical data signal containing the embedded metadata.

8. The method of claim 1, wherein the step of embedding the robust watermark further comprises embedding a plurality of copies of the robust watermark into the medical data signal.

9. The method of claim 6, wherein the step of embedding the robust watermark further comprises:
partitioning the time-series sequence into a plurality of subsequences; and
embedding the robust watermark in each one of the plurality of subsequences.

10. The method of claim 9, wherein each subsequence comprises a first bit string length, the watermark comprises a second bit string length and the first bit string length is three times the second bit string length.

11. The method of claim 1, wherein the step of embedding the robust watermark further comprises randomly generating a binary code representation of the metadata using the metadata in combination with a secret key.

12. The method of claim 11, wherein the step of randomly generating the binary code further comprises using the metadata and the secret key in a cryptographically secure hash function.

13. The method of claim 11, wherein the step of embedding the robust watermark further comprises incorporating an error correcting code into the binary code representation of the metadata.

14. The method of claim 13, wherein the step of incorporating the error correcting code further comprises using Hamming coding.

15. The method of claim 14, wherein the step of using Hamming coding further comprises mapping four bit groupings from the binary code into seven bit groupings.

16. The method of claim 1, wherein the step of embedding the fragile watermark further comprises embedding the fragile watermark in a spatial domain of the medical data signal.

17. The method of claim 1, wherein the metadata comprises personal information for a patient from which the medical data signal was obtained.

18. A non-transitory computer-readable medium containing a computer-readable code that when read by a computer causes the computer to perform a method for embedding metadata within medical data, the method comprising:
embedding within actual medical data in a given medical data signal a robust watermark comprising an encrypted version of metadata related to the actual medical data that given medical data signal wherein removal of the robust watermark disturbs the actual medical data; and
embedding a fragile watermark into that given medical data signal on top of a resulting medical data signal containing the robust watermark in least significant bits of the medical data signal to provide tamper identification of the actual medical data.

\* \* \* \* \*